United States Patent
Shellhause

[15] 3,698,260
[45] Oct. 17, 1972

[54] VEHICLE BRAKE CONTROL MODULE AND PEDAL LEVER MOUNTING AND HINGE MEANS THEREFOR

[72] Inventor: Ronald L. Shellhause, Vandalia, Ohio

[73] Assignee: General Motors Corporation, Detroit, Mich.

[22] Filed: June 30, 1971

[21] Appl. No.: 158,426

[52] U.S. Cl. ..................................74/560, 16/172
[51] Int. Cl. .............................................G05g 1/04
[58] Field of Search ..74/560, 512; 16/146, 147, 171, 16/172

[56] References Cited

UNITED STATES PATENTS

| | | | |
|---|---|---|---|
| 3,111,861 | 11/1963 | Young | 74/560 |
| 3,183,995 | 5/1965 | Schultz | 74/560 X |

FOREIGN PATENTS OR APPLICATIONS

| | | | |
|---|---|---|---|
| 219,992 | 2/1962 | Austria | 74/560 |

Primary Examiner—William F. O'Dea
Assistant Examiner—F. D Shoemaker
Attorney—W. E. Finken et al.

[57] ABSTRACT

A vehicle brake control module comprising a bracket to which the brake booster and master cylinder are mounted on one side and the brake pedal lever is pivotally mounted on the other side, the pedal lever being connected to operate the booster and master cylinder when the pedal is depressed. The module is adapted to be easily installed through an aperture in a suitable vehicle panel such as the firewall, the bracket closing the aperture. The pedal lever is hinged to the bracket by a pinless hinge formed of scrolls or rolls integrally formed from the bracket and the pedal lever and arranged to permit pedal lever removal and replacement only when the pedal lever is disconnected from the booster and moved out of its usual operating range. The hinge has bushing means attached to one of the rolls and fitting between the rolls. Due to lack of space to provide reinforced pedal lever sections, the portion of the pedal lever adjacent the rolls formed thereon is arranged to be primarily in compression during at least the middle to full-stroke portion of the brake apply range of movement.

9 Claims, 3 Drawing Figures

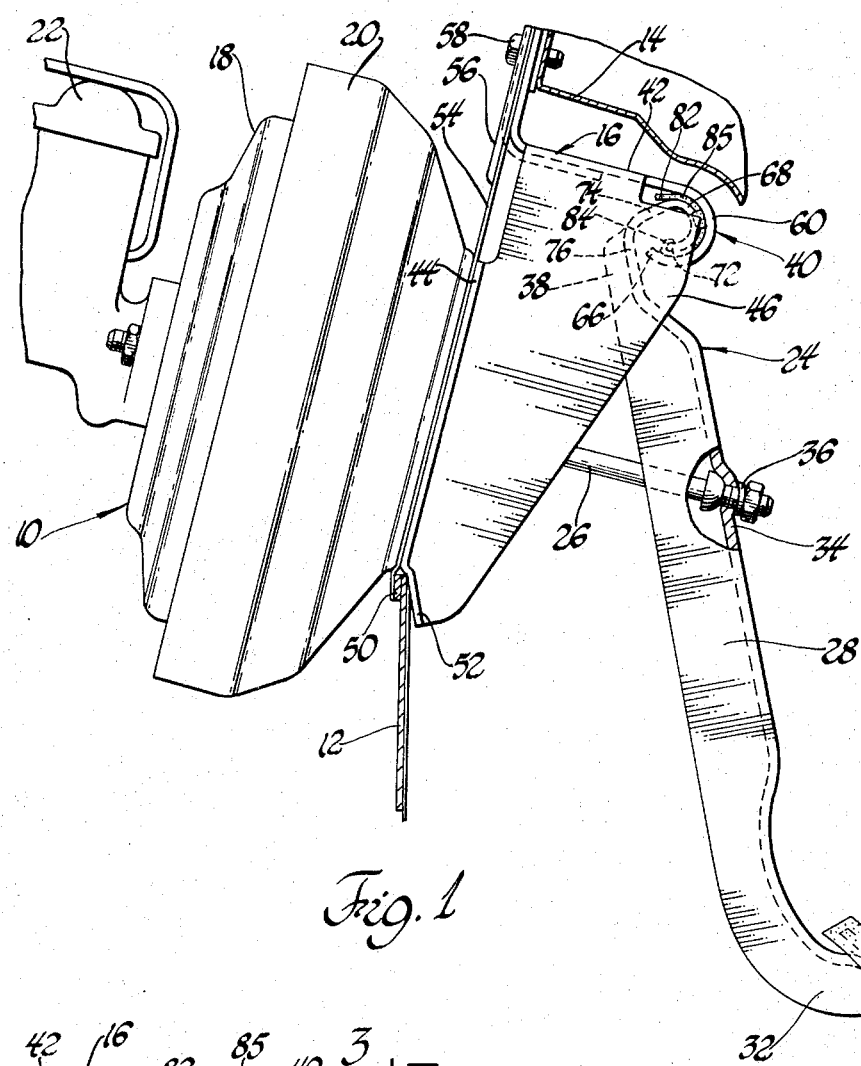

VEHICLE BRAKE CONTROL MODULE AND PEDAL LEVER MOUNTING AND HINGE MEANS THEREFOR

The invention relates to a brake control system and, more particularly, to one assembled as a module and installed in position through a vehicle panel aperture. It further includes the particular mounting arrangement for the module brake pedal lever and the hinge by which the brake pedal lever is pivotally mounted to the mounting bracket forming a portion of the module.

The coiled fulcrum pedal mounting arrangement simplifies assembly operations, reduces the amount of separate parts required, and reduces parts costs in comparison to pedal mounting arrangements in typical automobiles currently being produced. The hinge is of the pinless type and employs a knuckle roll formed as a scroll from an integral part of the mounting bracket, and a pintle roll formed as a scroll from an integral part of the brake pedal lever. In its preferred form, a sheet-like bushing is provided with a hooked edge which is connected to the pintle roll, this assembly then being positioned against the inside surface at the top of the support bracket with the pedal lever in a position substantially parallel to the inside surface of the top of the support bracket. The pedal lever roll and bushing are moved in an axially translational manner relative to the knuckle roll so that the pintle roll and the bushing fit into the knuckle roll on the support bracket. The pedal lever is rotated to complete the hinge assembly. The pedal lever is then suitably attached to the booster push rod and is retained by the push rod so that the lever cannot be raised to the installation position. The pedal lever roll is, therefore, effectively prevented from coming out of the mounting bracket roll.

The degree of wrap of the rolls and the diameter thereof prevent relative axial translational movement of the rolls throughout the brake booster operational range. The assembly particularly lends itself to preassembly in the brake control module disclosed and claimed in application Ser. No. 158,476 entitled "Vehicle Brake Control Module and Mounting Means" and filed on even date herewith by the same inventor and assigned to the common assignee.

In the drawing:

FIG. 1 is an elevation view with parts broken away and in section of a vehicle brake control mechanism embodying the invention.

FIG. 2 is an enlarged fragmentary cross-section view of the hinge portion of the mechanism of FIG. 1, with parts broken away and illustrated in various positions.

FIG. 3 is an elevation view of the mechanism illustrated in FIG. 2 taken in the direction of arrows 3—3 of that FIGURE.

The brake control module 10 is illustrated as being mounted on the vehicle panel 12, usually the vehicle firewall, and underneath a portion of the instrument panel 14. The module includes a mounting bracket 16, a brake system operator 18 which is illustrated as being composed of a brake booster 20 and a master cylinder assembly 22. The operator may be any of several other known types. The brake system operator 18 is mounted on one side of the mounting bracket 16 so that it normally projects into the vehicle compartment forward of the firewall panel 12. The module also includes the brake pedal assembly 24 and the push rod 26. The brake pedal assembly 24 includes a brake lever or arm 28 on one end of which is mounted a pedal or foot pad 30. The end of the lever on which pedal 30 is mounted provides a force-receiving section 32. A center portion 34 of the lever 28 provides a force-applying section to which one end of the push rod 26 is attached by a pivot connection 36. The other end of lever 28 includes a pivot section 38, a portion of which is described in greater detail below and forms a part of the brake pedal lever hinge assembly 40.

The support bracket has an upper plate section 42 extending from the main mounting bracket body 44 and formed as described below to provide another part of the hinge assembly 40. Side plates 46, 48 are suitably formed as a part of the mounting bracket 16 to provide strength to the bracket and to cooperate as a part of the hinge assembly 40, as described below. In the construction illustrated, the side plates 46 and 48 are folded from the upper plate 42. The mounting bracket has tangs 50 and 52, depressed out of the plane of the mounting bracket body 44 along the lower edge portion thereof, which receive therebetween the portion of the firewall panel forming the edge of the panel aperture 54 through which the module 10 extends. The tangs are preferably on the lower portion of the body 44 so that they fit over the lower edge portion of the aperture 54. There may be provided more than the two tangs shown in accordance with design requirements. Opposite the tangs 50 and 52 is located suitable tab means 56 extending in the plane of the mounting bracket body 44 and over an upper portion of the panel 12 adjacent aperture 54. In the preferred construction, a single tab is desirable. This tab provides for the fastening of the upper part of the mounting bracket to the panel 12 by suitable fastening means, such as the bolt assembly 58.

It can be seen that the module is capable of being installed as a unit from the forward side of panel 12 by first inserting the pedal 30 through aperture 54 and moving the module rearwardly and downwardly to engage tangs 50 and 52 over panel 12, then pivoting the module about this portion of panel 12 to bring tab means 56 into position against the upper portion of panel 12. The bolt assembly 58 is then inserted and tightened, thus completing the installation of the module. This has distinct advantages of assembly and subassembly pretest capacity, as well as advantages in removal and replacement of components.

The hinge assembly 40 is of the pinless type, with the upper plate 42 of the mounting bracket extending rearwardly and being formed in a scroll fashion to provide a fixed support scrolled end 60 which is the knuckle roll of the hinge. The roll 60 is formed about an axis 62 and has a constant radius inner surface 64. The roll extends circumferentially more than 180° from the plane of the upper plate 42 and has its outer end 66 terminating in circumferentially spaced relation to the inner surface of the portion of the upper plate 42 where the roll begins. The upper plate 42 thus forms a hinge section which extends tangentially from the roll 60 and the distance between the roll outer end 66 and the upper plate 42 is less than the diameter of the inner surface 64 of the roll.

The pivot section 38 of the brake pedal lever 28 also has a scrolled end 68 which is the pintle roll of the hinge assembly 40. In the assembled position shown in FIGS. 2 and 3, the axis 70 of roll 68 is coaxially positioned with the axis 62 of the roll 60. The side plates 46 and 48 are positioned so that they substantially close the ends of the knuckle roll 60, thereby preventing substantial axial movement of the pintle roll 68. This prevents axially directed disassembly or assembly of the hinge assembly 40.

Roll 68 extends at a constant outer surface radius for a circumferential distance greater than 180° so that the scroll or roll outer end 72 extends toward the brake pedal lever section 74 which extends tangentially from the beginning scroll 68, the distance between the scroll outer end 72 and the tangentially extending section 74 being less than the diameter of the outer surface of the scroll 68. The lever tangentially extending section 74 provides a hinge section connecting the pintle roll 68 to the main body of the brake pedal lever 28. Due to space limitations, section 74 is substantially flat and therefore is not shaped to best resist bending loads. However, the lever section 76 to which it is attached can be, and preferably is, formed in the manner shown to provide greater resistance to bending. In order to minimize the bending loads on section 74, the relationship between the degrees of circumferential extension of the rolls 60 and 68 and the dimensions thereof, the relative tangential angles of the hinge sections 42 and 74, and the angle between sections 74 and 76 are such that the load on section 74, particularly when the brake pedal lever 28 is in the middle to full-stroke position during brake application and therefore transmitting higher forces, the loading on section 74 is primarily in compression. In order to provide for assembly of the brake pedal lever to the mounting bracket, and to provide for retention of the pintle roll 68 in the knuckle roll 60 during all operational positions of the brake pedal lever, the angle 78 between sections 74 and 76 is greater than a right angle and the angle 80, at which the section 74 must be positioned relative to the plane of the hinge section 42 in order to move the pintle roll 68 in translation relative to knuckle roll 60 and thereby assemble or disassemble the hinge assembly, is also greater than a right angle. In this position the outer ends of the rolls clear each other to permit translational movement, as shown in phantom in FIG. 2.

In order to provide a bearing arrangement for the hinge, a flexible sheet bushing 82 is utilized. This bushing has a hooked end 84 which fits over the outer end 72 of the pintle roll 68, and a main body 85, formed as a sheet, extending over the outer surface 86 of roll 68 and, with the hinge assembled, in engagement with the inner surface 64 of roll 60. The bushing 82 may be provided as a flexible sheet of suitable material such as polypropylene or nylon. Prior to assembly, the end 84 is hooked over the end of roll 68. The roll and bushing are then positioned against the inside surface of upper plate 42, the lever extending generally parallel to the upper plate. The lever and bushing are next moved translationally rearward and the lever is rotated downwardly so that the roll axes 62 and 70 coincide. The bushing wraps around the pintle roll 68 and inside the knuckle roll 60 as shown. The pivot connection 36 is then made to connect the brake pedal lever 28 and the push rod 26. Since the push rod is retained in the booster or master cylinder, depending upon whether or not the booster 20 is utilized, the pedal lever cannot be moved counterclockwise, as seen in FIGS. 1 and 2, to a position where the hinge assemblies will come apart. Thus, throughout the entire brake operational range of the pedal, the hinge assembly provides a fulcrum for the brake pedal lever about the coincident axes 62 and 70.

What is claimed is:

1. In a vehicle brake mechanism having a brake pressurizing device, the improvement comprising:
a brake pedal arm having a foot pad mounted at one end, a push rod pivotally attached to a center portion and connected to the brake pressurizing device for actuation of the device and controlling the limits of return movement of said pedal arm, and a scrolled other end curved about the pivot axis of the pedal arm, a fixed support with said brake pressurizing device mounted thereon and having a scrolled end receiving said pedal arm scrolled end in pivotal interlocking relation and cooperating therewith to form a pivot joint permitting pivotal movement of said pedal arm about the said pedal arm pivot axis and within a predetermined range of pivotal movement determined by said push rod and the device limiting said arm to such pivotal movement.

2. A pivotal lever mounting arrangement comprising: a support and fulcrum member having an upper plate and a pair of side plates extending therefrom, said upper plate having a portion extending therefrom formed to provide a scroll having a constant radius of curvature for more than 180° and a scroll axis extending between portions of said side plates, the outer end of said scroll being under and circumferentially spaced from and generally parallel to the main body of said upper plate, a lever having a force-receiving section and a force-applying section and a pivot section, said pivot section having a scroll formed by one end of said lever, said scroll having a constant radius of curvature for more than 180° and of less outer surface radius than the inner surface radius of said upper plate scroll and having a section extending tangentially from the inner end of said scroll to a point beyond the outer surface radius of said upper plate scroll and then bent toward the outer end of said scroll and spaced therefrom and then merging with said lever force-applying section, said lever scroll being received pivotally within said upper plate scroll and between said side plates with said scrolls having a common axis when in operative assembled relation.

3. The pivotal lever mounting arrangement of claim 2 in which said lever tangentially extending scroll section is placed primarily in compression when said lever has force applied to its force-receiving section at least during substantially the last half of the movement of said lever pivotally toward the main body of said upper plate.

4. The pivotal lever mounting arrangement of claim 2 further having flexible bushing means received between said scrolls in surface bearing relation and secured to one scroll outer end and extending between said scrolls over the bearing surface of the scroll to which said bushing means is secured.

5. In a pinless hinge of the type having a pintle roll and a knuckle roll receiving the pintle roll in pivotal relative movement, the improvement comprising: a low friction coefficient flexible sheet bushing received between the pintle roll and the knuckle roll in surface bearing relation and secured to one of said rolls against circumferential movement.

6. In a pinless hinge of the type having a pintle roll and a knuckle roll receiving the pintle roll in pivotal relative movement, the improvement comprising: first and second hinge sections respectively extending tangentially from said pintle roll and said knuckle roll, said knuckle roll being circumferentially open ended in an amount sufficient to translationally receive said pintle roll for assembly only when said first hinge section is at an obtuse angle from said second hinge section, the relationship between the degrees of circumferential extension of said rolls and the diameters thereof preventing relative axial translational movement of said rolls at least throughout the acute angle pivotal movement range between said first and second hinge sections.

7. In the improved hinge set forth in claim 6, a lever integrally formed with said first hinge section and extending therefrom at an obtuse angle on the side thereof opposite said second hinge section, said hinge rolls cooperatively providing a fulcrum for said lever, said first hinge section being primarily in compression when said lever is forcibly pivoted about the hinge fulcrum to move said first hinge section toward said second hinge section throughout at least a major portion of said acute angle pivotal movement range.

8. In the improved hinge set forth in claim 6, said second hinge section having folded sides substantially closing off the axial ends of said knuckle roll and preventing substantial axial movement of said pintle roll relative to said knuckle roll.

9. A vehicle brake control module for installation through an apertured vehicle panel and comprising: a mounting bracket having secured thereto a brake system operator on one side and a pivotal brake pedal lever on the other side, and means for removably attaching the mounting bracket to the apertured vehicle panel so that the mounting bracket fills and closes the aperture with the brake system operator extending on one panel side and the brake pedal lever extending on the other panel side, said brake pedal lever and said brake system operator being connected by means extending through said bracket for operation of said brake system operator by pivotal movement of said brake pedal lever toward and away from said brake system operator; said mounting bracket and said brake pedal lever having cooperating coaxially positioned scrolls formed thereon providing a pinless pedal hinge having an operative assembled pivotal relation interlocked against disassembly when the pedal lever is in any brake system operator operating position and having a brake pedal lever scroll axis in translatable relation to the axis of the mounting bracket scroll for removal and replacement of the brake pedal lever when the connecting means is disconnected from the brake pedal lever and the brake pedal lever is pivoted away from the brake system operator beyond any brake system operator operating position.

* * * * *